US Patent Office 3,398,114
Patented Aug. 20, 1968

3,398,114
LIGHT AND HEAT STABILITY OF POLYVINYL
CHLORIDE RESINS
Mark W. Pollock, New York, N.Y., assignor to Argus Chemical Corporation, Brooklyn, N.Y., a corporation of New York
No Drawing. Continuation-in-part of application Ser. No. 336,887, Jan. 10, 1964. This application Dec. 10, 1964, Ser. No. 417,513
9 Claims. (Cl. 260—45.75)

ABSTRACT OF THE DISCLOSURE

The resistance to deterioration due to heat and/or light of polyvinyl chloride resins is improved by incorporating therein a stabilizer composition containing an organotin moiety, a phenolic antioxidant and a mercaptoacetic acid moiety, and/or an alpha-mercaptopropionic acid moiety and/or a thiomalic acid moiety.

---

This application is a continuation-in-part of my application Ser. No. 336,887, filed Jan. 10, 1964, now abandoned.

This invention relates to polyvinyl chloride resin stabilizer compositions containing an organotin moiety, a mercapto acid moiety or a mercapto acid group linked to tin in the organotin moiety and an antioxidant, and to polyvinyl chloride resin compositions incorporating the same and having, as a result an improved resistance to deterioration upon heating, and upon exposure to light, and to a process of improving the resistance to light and heat of polyvinyl chloride resins using such compositions.

Many organotin compounds are now widely recognized as the best available single-compound stabilizers for polyvinyl chloride resins. However, all of them are expensive and even the best of these is not always satisfactory, so that they are not as widely used as the less costly stabilizer systems. Moreover, they have little effect on improving stability to light.

Numerous types of organotin compounds have been proposed for stabilization of polyvinyl chloride resins, among them, the alkyl tin mercaptides and alkyl tin mercaptoesters described in U.S. Patents Nos. 2,914,506 to Mack 2,801,258 and 2,891,922 to Johnson, 2,726,254 and 2,870,119 to Leistner, 2,726,227 to Leistner, and 2,641,588 to Leistner, and 2,954,363 to Kuehne; the alkyl tin mercaptoacid ester compounds, described in U.S. Patent No. 2,641,596; the alkyl tin amides of thio acids described in U.S. Patent No. 2,704,756 to Leistner; and the alkyl tin cyclic glycol thio acid esters described in U.S. Patent No. 2,752,325 to Leistner; the alkyl tin xanthates described in U.S. Patent No. 2,759,906 to Leistner; and the alkyl tin esters of mercapto alcohols of U.S. Patents Nos. 2,870,119, 2,870,182, 2,872,468 and 2,883,363 to Leistner et al.

These organotin compounds have in common a hydrocarbon group directly attached to the tin atom through a carbon atom, and a sulfur-containing radical attached to the tin atom through the sulfur atom. This combination of radicals is recognized as giving optimum heat stabilization, from the standpoint of clarity and minimum loss of hydrogen halide from the resin. Sulfur-containing radicals impart odor, however, and when quantities are limited to those at which odor is so slight as to be inoffensive, heat stabilization suffers. Thus, they are in effect limited to products in which odor is no problem.

Several types of organotin compounds have been suggested in which the tin is not linked to sulfur. These compounds have a hydrocarbon group directly attached to tin through a carbon atom, and an oxygen-containing group, such as an alkoxy or an ester group, attached to tin through oxygen. Typical of these compounds are those described in U.S. Patents Nos. 2,938,013, to Mack et al., and 2,680,107 to Leistner et al. However, the oxygen-containing radicals do not impart as good a heat-stabilizing effect as sulfur radicals.

U.S. Patent No. 2,307,157 to Quattlebaum et al. suggests the use of sulfur-free organotin carboxylates as the sole color-stabilizing agents for vinyl chloride compositions. These compounds are not as effective as sulfur-containing compounds, although certain compounds, such as, for example, the bis-(dialkyltin monoester) maleates, complex compounds containing two tin atoms per molecule, give some degree of protection.

Leistner et al., in U.S. Patent 2,564,646 discloses the use of organic phosphites as anti-clouding agents in conjunction with polyvinyl chloride stabilizers including various organic and inorganic lead salts, calcium, strontium, barium, cadmium, zinc, and tin salts of fatty acids, various organotin compounds including dibutyl tin oxide, dibutyl tin laurate, dibutyl tin maleate, and tetraphenyl or tetraalkyl tin. These organotin compounds are not sulfur-containing, and are not as effective as the salts of fatty acids in the phosphite combination suggested. The patentees state that if less effective anti-clouding action is acceptable, then the phosphites can be replaced by organic sulfides or by hindered phenols and these last-mentioned components are even less effective than the phosphite in combination with the organotin salts disclosed. As indicated in the Leistner et al. patent, a hindered phenol is a phenol in which there are alkyl groups ortho to each phenolic hydroxyl group and hence in which there are no hydrogen atoms in the ortho position.

In accordance with the present invention, stabilizer combinations for polyvinyl chloride resins to improve their resistance to deterioration when heated at 350° F. and when exposed to light are provided comprising an organotin moiety, a mercapto acid moiety, and an antioxidant. The polyvinyl chloride resins of the invention accordingly comprise an organotin moiety, a mercapto acid moiety and an antioxidant. The mercapto acid moiety and the antioxidant alone impart no observable stabilizing effect, but synergize the stabilizing effect of the organotin moiety such that the three together whether in the same or different molecules are far more effective than any one or two alone in any combination.

Since 350° F. is the temperature normally used to gauge the effectiveness of polyvinyl chloride resin stabilizers, optimum protection is afforded by means of the stabilizer combinations of this invention.

These moieties may be present each in separate compounds or in any combination of two or more in a compound molecule, such as in an organotin compound or in an anti-oxidant, and it will be understood therefore that the term "moiety" as used in this specification and claims is inclusive of compounds containing only one or two or more of such moieties of the same or different kinds in any combination in a stable molecule in which molecule such moities display stabilizing effectiveness for polyvinyl chloride resins.

The organotin moiety can be characterized as an organic group linked to tin by means of carbon in not more than three of the tin valences. The remaining tin valences can be taken by groups linked to tin by sulfur or by oxygen.

Thus, the organotin moiety has the structure:

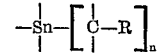

where R is hydrogen or an organic radical and $n$ has a value from 1 to 3.

The mercapto acid moiety has at least one mercapto group SH or residue thereof and at least one carboxylic acid radical COOM, wherein M can be hydrogen, an esterifying radical R or a salt-forming cation. Thus, this moiety has the structure:

$$(-S-)_{n_1} Z(-COO-)_{n_2}$$

in which Z is the remainder of the molecule and $n_1$ and $n_2$ are the number of mercapto residues and carboxylic acid residues, respectively, and will usually be a number from 1 to 10. The free valences of the mercapto group and carboxylic acid group are taken with any type of radical reactive with mercapto and carboxylic acid groups, respectively, such as the tin atom of an organotin moiety, or hydrogen or an alcohol residue or salt-forming cation.

Thus, the mercapto acid moiety can be linked to tin in an organotin compound containing the organotin moiety. It could be present therein as the oganotin salt through the carboxy linkage and the mercapto group or through only one or the other of them. The organotin compound can also include mercapto acid groups linked to tin through carbon, and these groups also function as mercapto acid moieties in accordance with the invention.

The antioxidant can be any compound known to inhibit deterioration of organic substances in the presence of oxygen, such as a phenol, a compound containing at least one thio sulfur atom, an organic phosphite and an organic amine or aminophenol.

Further details will now be given or organotin compounds, mercapto acid compounds, and antioxidants that can be used in this invention.

The organotin compounds useful in this invention can be defined by the formula:

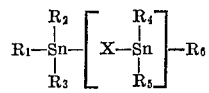

wherein X is oxygen, sulfur or a bivalent linking radical, linked to tin through oxygen, sulfur or carbon, and containing from one to about ten carbon atoms, and the R's are oxide, hydroxide OH (stannonic acid), or organic groups containing from one to about thirty carbon atoms linked to the tin through carbon or oxygen or sulfur, of which at least one and not more than three per tin atom is linked to tin through carbon, and $m$ is an integer ranging from zero to about fifteen. Optionally, one or more organic groups can be mercapto acid groups linked to tin through the sulfur of the mercapto group or the carboxylic acid group or carbon.

The R organic groups in the above formulae can, for example, be selected from among aryl, aryloxy, alkyl, alkenyl, alkoxy, cycloalkyl, cycloalkenyl, acyl, acyloxy, mixed alkyl aryl, mixed aryl alkyl and heterocyclic groups, and such groups containing mercapto groups and carboxylic acid groups or residues thereof. The R groups can also contain inert substituent groups such as halogen, alkoxy, and ester groups.

X can be, for example, alkylene, arylene, alkyleneoxy, arylalkylene, alkylarylene and heterocyclic groups, and such groups containing mercapto groups and carboxylic acid groups or residues thereof.

The organotin compounds thus can be organotin oxides and stannonic acids having at least one and not more than three per tin atom organic radicals linked to tin through carbon, as well as, optionally, other organic radicals as aforesaid.

The preferred tin compounds within the generic class applicable to this invention can be further defined by the formula:

$$(R_7)_{n_1}-Sn-[(-S-)_{m_1} Z(-COO-)_{m_2}]_{n_2}$$

In the above formula, $R_7$ is a hydrocarbon radical having from about one to about thirty carbon atoms, which can contain inert substituent groups such as halogen, alkoxy and ester groups, and $$(-S-)_{m_1} Z(-COO-)_{m_2}$$

is a mercapto acid group derived from a mercapto organic carboxylic acid which can, if desired, contain additional carboxylic acid groups, mercapto groups, carboxylic acid salt groups, ester groups, ether groups and hydroxyl groups, and is linked to tin through sulfur,

or carbon. The sum of $n_1$ and $n_2$ is four, $m_1$ and $m_2$ are numbers from 1 to about 5, and Z is a bivalent hydrocarbon radical carrying the S and COO groups and having from one to about thirty carbon atoms, such as alkylene, arylene, or cycloalkylene radical.

$R_7$ can, for example, be an aliphatic group such as alkyl and alkenyl, an aromatic group such as aryl, mixed alkyl aryl, and mixed aryl alkyl, a cycloaliphatic group such as cycloalkyl and cycloalkenyl, or a heterocyclic group, such as methyl, ethyl, propyl, propenyl, isopropyl, n-butyl, butenyl, isobutyl, tert-butyl, sec-butyl, amyl, hexyl, octyl, oleyl, 2-ethylhexyl, iso-octyl lauryl, stearyl, behenyl, phenyl, methoxy phenyl, benzyl, chlorobenzyl, cumyl, allyl, tolyl, xylyl, carboxy-methyl phenyl, furfuryl, cyclohexyl, naphthyl, cyclopentyl, furyl, and tetrahydrofurfuryl. The aliphatic and cycloaliphatic groups are preferred.

The $(-S-)_{m_1}-Z-(-COO-)_{m_2}$ group is derived from an organic mono or polymercapto carboxylic acid. These also can be used per se, as the compound supplying the mercapto acid moiety, and the following will be understood to be useful either to furnish $(-S-)_{m_1}-Z-(-COO-)_{m_2}$ groups for the organotin compound or per se as such moiety. These include the aliphatic, aromatic, cycloaliphatic and heterocyclic acids, which contain at least one mercapto group, and can also contain inert substituents such as halogen, hydroxyl, keto and alkoxy groups, such as, for example, mercaptoacetic acid, mercaptopropionic acid, mercaptooleic acid, mercaptoricinoleic acid, mercaptolinoleic acid, mercaptostearic acid, mercaptobutyric acid, mercaptovaleric acid, mercaptohexanoic acid, mercaptooctanoic acid, thiolactic acid, mercaptolevulinic acid, mercaptolauric acid, mercaptobehenic acid, thiotartaric acid, mercaptopalmitic acid, mercaptobenzoic acid, mercaptomethylbenzoic acid, mercaptocyclohexane carboxylic acid, mercaptofuroic acid, thiomalic acid, mercaptoglutaric acid, mercaptoazelaic acid, mercaptomalonic acid, mercaptoadipic acid, mercaptopimelic acid, mercaptosuberic acid, mercaptosebacic acid, and mercaptoterephthalic acid, and their metal salts, and esters thereof with mono and polyhydric alcohols having from one to about thirty carbon atoms.

The metal salts can be the alkali metal salts, such as sodium, potassium and lithium, the alkaline earth metal salts, such as calcium, barium, and strontium, and other polyvalent metal salts such as zinc, copper, cadmium, tin, nickel, antimony, lead, magnesium and manganese.

The preferred mercapto acids are the saturated dibasic acids, as well as the monohydric and polyhydric alcohol half or mono esters thereof. Included in this preferred group are mono-esters of these acids with, for example, methyl alcohol, ethyl alcohol, propyl alcohol, isopropyl alcohol, n-butyl alcohol, isobutyl alcohol, sec-butyl alcohol, tert-butyl alcohol, 2-ethyl hexyl alcohol, isooctyl alcohol, lauryl alcohol, behenyl alcohol, phenol, cyclohexanol, ethylene glycol, diethylene glycol, triethylene glycol, propylene glycol-1,2, propylene glycol-1,3, decamethylene glycol, dipropylene glycol, ethyl ether of ethylene glycol, and butyl ether of butylene glycol-1,3.

Where desired, groups derived from several different organic acids may be linked to the same tin atom. An example of such a compound is dibutyltin thiomalate laurate.
Mixtures of several organotin compounds meeting the requirements of the above definition can be employed where desired.
The following organotin compounds are typical of those coming within the invention:
1. 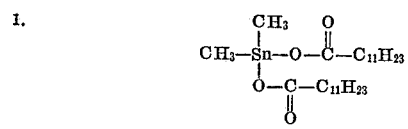
2. 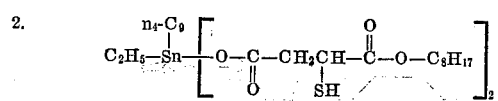
3. 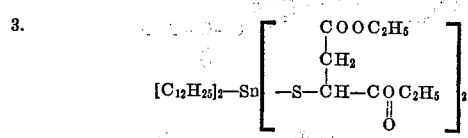
4. 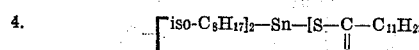
5. 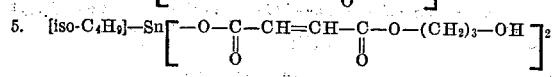
6. 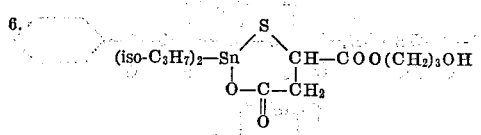
7. 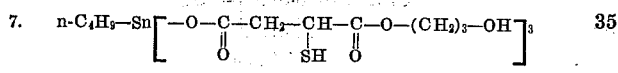
8. 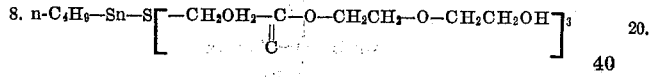
9. 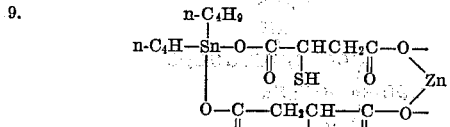
10. 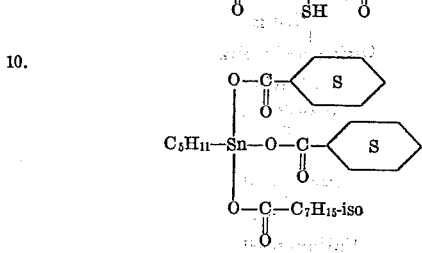
11. 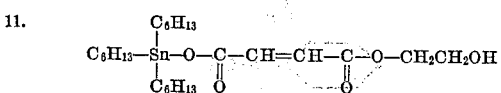
12. 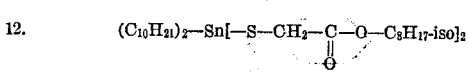
13. 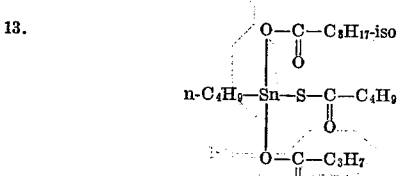
14. 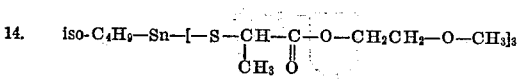
15. 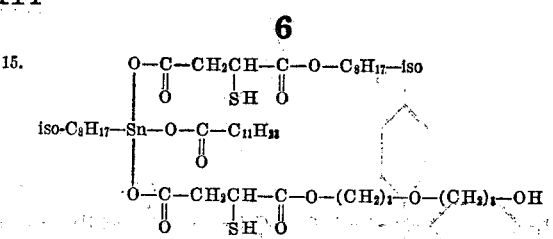
16. 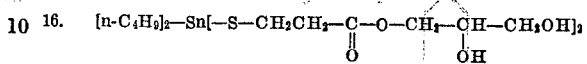
17. 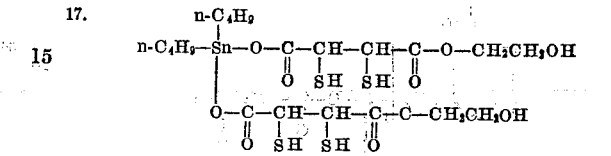
18. 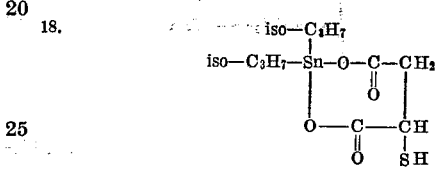
19. 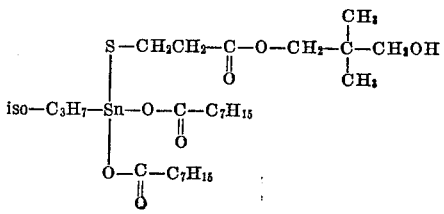
20. 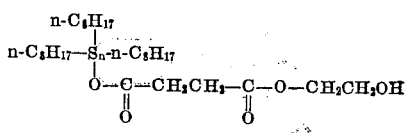
21. 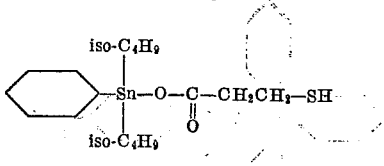
22. 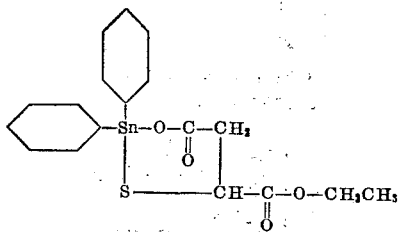
23. 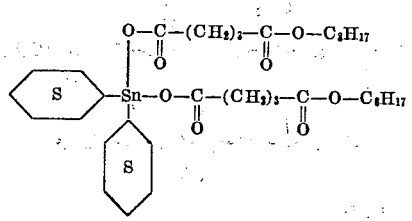
24. 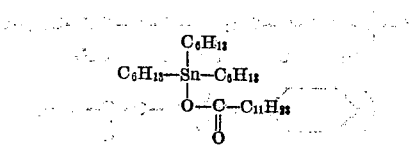

25. 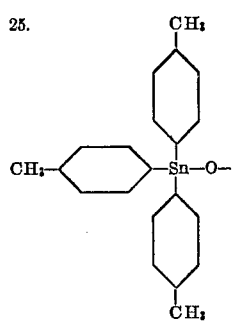
26. 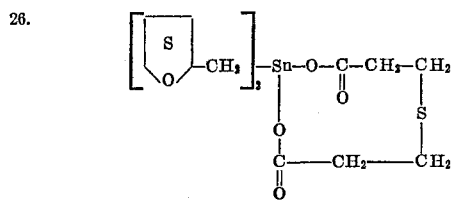
27. 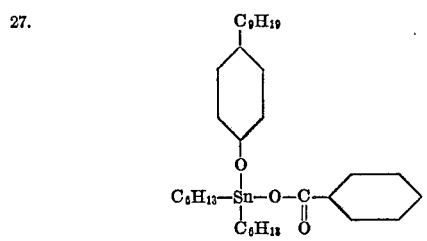
28. 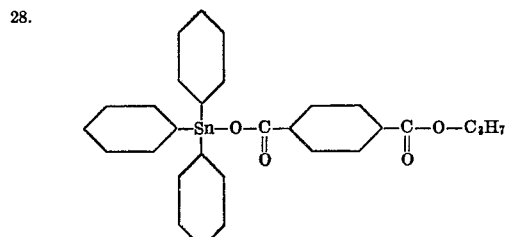
29. 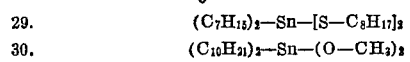
(C₇H₁₅)₂—Sn—[S—C₈H₁₇]₂
30. (C₁₀H₂₁)₂—Sn—(O—CH₃)₂
31. 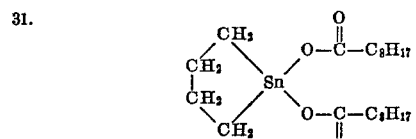
32. 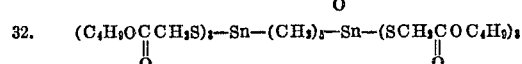
(C₄H₉OCCH₂S)₃—Sn—(CH₂)₃—Sn—(SCH₂COC₄H₉)₃
33. 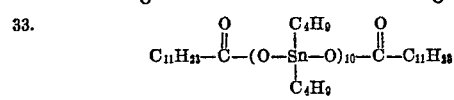
34. 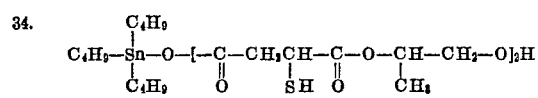
35. 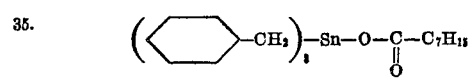
36. 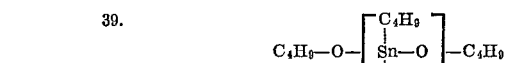
37. 
38. 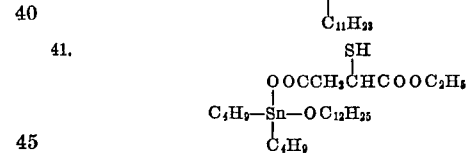
39. 
40. 
41. 
42. 
43. 
44. 
45. 
46. 
47. 
48. 
49. 

50. 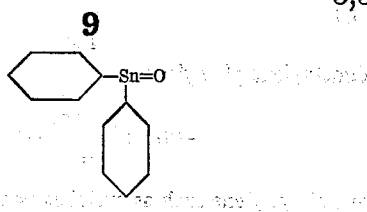

51. $(C_{18}H_{37}-)_2Sn\cdot O$

52. 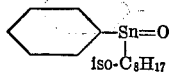

53. 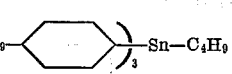

54. 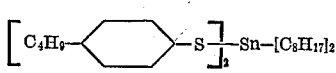

55. $(iso-C_8H_{17})_2Sn-(S-CH_2-COOH)_2$
    $\phantom{(iso-C_8H_{17})_2Sn-(S-}|$
    $\phantom{(iso-C_8H_{17})_2Sn-(S-}CH_3$ These compounds are readily prepared by well known means. For example, the preferred tin mercapto carboxylate compounds are prepared from the corresponding organotin oxides and stannonic acids, which react with the mercapto organic carboxylic acid to yield derivatives applicable to the invention. The reactions for such preparations are as follows:

1. 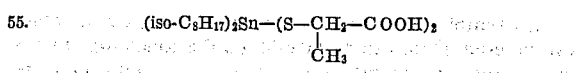

2. 

3. 

Additional details on the preparation of organotin compounds can be had by reference to the publication, "The Development of the Organotin Stabilizers," by H. Verity Smith (The Tin Rerseach Institute, Middlesex, England, 1959).

The antioxidant component can be any organic compound capable of inhibiting deterioration of organic substances in the presence of oxygen. The most available are the phenols; compounds having a thio sulfur atom, such as the organic sulfides and polysulfides; and the thiodipropionic acid esters; and aromatic amines; phosphorous acids; and organic phosphites such as the triphosphites and acid phosphites.

The phenol compounds have the structure

wherein R can be hydrogen or an organic radical containing from one to thirty carbon atoms such as an alkyl, aryl, alkenyl, alkaryl, aralkyl, or cycloalkyl hydrocarbon group, an aromatic ring condensed with the phenol ring, a heterocyclic group, an alkoxy, halogen or an acyl group

where R' is aryl, alkyl or hydrogen; and $x_1$ and $x_2$ are integers from one to four, and the sum of $x_1$ and $x_2$ does not exceed six.

Representative phenols include guaiacol, resorcinol monoacetate, vanillin, α-naphthol, β-naphthol, butyl salicylate, 2,6-ditert-butyl-4-methyl phenol, 2-tert-butyl-4-methoxy phenol, nonyl phenol, dodecyl phenol, 2,4-dinonyl phenol, phenyl phenol, 2,3,4,5-tetradecyl phenol, tetrahydro-α-naphthol, eugenol, isoeugenol, thymol, glyceryl monosalicylate, methyl-p-hydroxybenzoate, ethyl-p-hydroxy cinnamate, 4-benzyloxyphenol, p-acetylaminophenol, p-stearylaminophenol, p-di-chlorobenzoylaminophenol and p-hydroxysalicyl anilide.

Exemplary polyhydric phenols are orcino, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexylcatechol, 2,6-ditertiary-butyl resorcinol, 2,6-diisopropyl phloroglucinol.

In the case of bicyclic phenols, the rings can be linked by oxyether or thioether groups or by alkylene, alicyclidene or arylidene groups. Such bicyclic phenols can be defined by the formula:

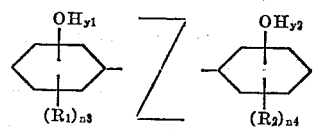

where Z is a single bond or an oxygen or sulfur atom or an alkylene or alicyclidene or arylene or a mixed alkylene-alicyclidene or alkylene-arylidene group, having a straight or branched chain, whose total number of carbon atoms preferably ranges from one to about ten, $y_1$ and $y_2$ are the number of phenolic hydroxyl groups OH, $n_3$ and $n_4$ are the number of R groups, and $R_1$ and $R_2$ are hydrogen or alkyl of one to about ten carbon atoms. Preferably, the OH groups are ortho and/or para to Z, and there must be a hydrogen atom ortho to at least one OH group in the molecule.

The sum $y$ and $n$ in each ring cannot, of course, exceed five.

Typical Z groups are

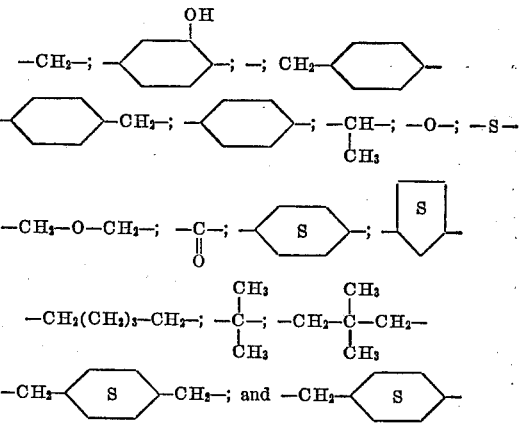

The various Z and R groups are exemplified in the following compounds.

Exemplary polyhydric bisphenols are methylenebis (2,6-ditertiarybutyl-phenol),
2,2-bis-(4-hydroxy phenyl) propane,
methylene-bis-(p-cresol),
4,4'-oxobis-(3-methyl-6-isopropyl phenol),
2,2'-oxobis-(4-dodecyl phenol),
4,4'-n-butylidenebis(-(2-tertiary butyl-5-methylphenol),
4,4'-benzylidenebis-(2-tertiary butyl-5-methylphenol),
4,4'-cyclohexylidenebis-(2-tertiary butylphenol),
4,4'-thio-bis-phenol,
4,4'-thiobis(3-methyl-6-tertiary-butyl-phenol),
2,2'thiobis(4-methyl-6-tertiary-butyl-phenol),
2,2'-methylenebis (4-methyl-6-(1'-methyl-cyclohexyl)-phenol),
2,6-bis(2'-hydroxy-3'-tertiary-butyl-5'-methylbenzyl)-4-methyl-phenol.

The thiodipropionic acid ester has the following formula:

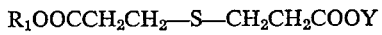
$R_1OOCCH_2CH_2—S—CH_2CH_2COOY$ in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkylene radicals; and Y is selected from the group consisting of (a) hydrogen, (b) a second R radical $R_2$, which can be the same as or different from the $R_1$ radical, (c) a polymeric chain of $n$ thiodipropionic acid ester units:

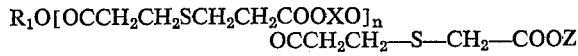
$R_1O[OCCH_2CH_2SCH_2CH_2COOXO]_n$
  $OCCH_2CH_2—S—CH_2—COOZ$ where Z in hydrogen, $R_2$ or M, $n$ is the number of thiodipropionic acid ester units in the chain, and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:
(a)     $R_1OOCCH_2CH_2SCH_2CH_2COOH$
(b)     $R_1OOCCH_2CH_2SCH_2CH_2COOR_2$
(c) $R_1[OCCH_2CH_2SCH_2CH_2COOX—O]_n$
  $OCCH_2CH_2SCH_2CH_2COOZ$
(d)     $R_1OOCCH_2CH_2SCH_2CH_2COOM$ In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

Typical R radicals are, for example, methyl, ethyl, propyl, isopropyl, butyl, isobutyl, t-butyl, amyl, isoamyl, n-octyl, isooctyl, 2-ethyl hexyl t-octyl decyl, dodecyl, octadecyl, allyl, hexenyl, linoleyl, ricinoleyl, oleyl, phenyl, xylyl tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any organic acid including those organic acids having from two to twenty carbon atoms, such as acetic, propionic, butyric and valeric acids, and the mercapto carboxylic acids named above.

Typical X radicals are alkylene radicals such as ethylene, tetramethylene, hexamethylene, decamethylene, alkyl-substituted alkylene radicals such as 1,2-propylene,

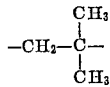

and

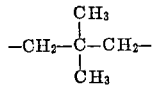

arylene radicals such as phenylene

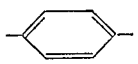

methylenephenylene

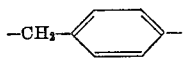

dimethylene phenylene,

and alicyclylene such as cyclohexylene

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonly thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono (dodecylbenzyl) thiodipropionic acid.

These esters are for the most part known compounds, but where they are not available, they are readily prepared by esterification of thiodipropionic acid and the corresponding alcohol.

The organic mono or polysulfide is any organic sulfur compound containing one, two or more sulfur atoms linked together in a polysulfide unit. Usually, the polysulfide will not have more than fifty carbon atoms. They can be defined by the formula:

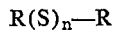
$R(S)_n—R$ wherein $n$ is the number of sulfur atoms in the polysulfide unit $(S)_n$ and ranges from one to about six, and R is an organic radical having from one to about thirty carbon atoms, such as alkyl, aryl, alkaryl, aralkyl, cycloalkyl and heterocyclic radicals. The R radical also may contain nitorgen, as in the case of the thiuram polysulfides, or oxygen, as in the case of alkoxy, carboxy, and alkylol radicals. The following compounds are typical: n-dodecyl trisulfide, dioctyl sulfide, didodecyl sulfide, diamyl sulfide, tertiary dodecyl disulfide, tetramethyl thiuram disulfide, tertiary octyl thiuram tetrasulfide, dimethyl thiuram hexasulfide, tetraethyl thiuram trisulfide, benzothiazyl disulfide, para-tertiary butyl phenyl trisulfide, dioctyl dithiodiacetate, dibenzyl disulfide, dibenzyl tetra sulfide, and dibenzyl trisulfide.

The triphosphite can be any organic triphosphite having attached to phosphorus through oxygen or sulfur groups selected from aryl, alkyl, cycloalkyl, aralkyl and alkaryl groups, in any combinations, such as, three monovalent groups, $(RA)_3P$; one monovalent group and one bivalent group, forming a heterocyclic ring with the phosphorus,

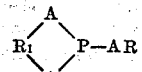

a plurality of bivalent groups forming polymers therewith,

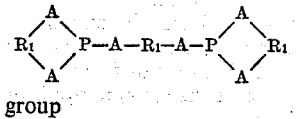

one trivalent group

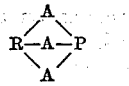

and a plurality of trivalent groups forming polymers therewith,

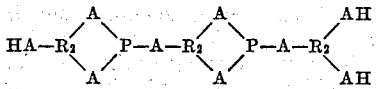

and any combinations of monovalent, bivalent and trivalent groups to form monomeric and polymeric phosphites; wherein A is oxygen or sulfur. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, di-isooctyl monotolyl phosphite, tri-2-ethyl hexyl phosphite, phenyl dicyclohexyl phosphite, phenyldiethyl phosphite, triphenyl phosphite, tricresyl phosphite, tri (dimethylphenyl) phosphite, trioctadecyl phosphite, triisooctyl phosphite, tridodecyl phosphite, isooctyl diphenyl phosphite, diisooctcyl phenyl phosphite, tri(t-octylphenyl) phosphite tri (t-nonlyphenyl) phosphite, benzyl methyl isopropyl phosphite, butyl dicresyl phosphite, isoctyl di(octylphenyl) phosphite, di(2-ethylhexyl) (isooctylphenyl) phosphite, tri(1-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, didecyl thiodiphenyl phosphite, tert-butyl phenyl thio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyldioxaphorinane and 2-cyclohexyloxy-5,5-diethyldioxaphosphorinane.

There can also be used phosphorous acids such as alkali metal acid phosphites, phosphorous acid, and the organic acid phosphites in which one or two of the R radicals of the triphosphites above is hydrogen, such as di(phenyl) phosphite, monophenyl phosphite, mono(diphenyl) phosphite, dicresyl phosphite, di(o-isooctylphenyl) phosphite, di(p-ethylhexyphenyl) phosphite, di(p-t-octylphenyl) phosphite, di-2-ethylhexyl phosphite, mono-2-ethyl hexyl phosphite, di-isooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di-(diphenyl) phosphite, di-(2-phenyl ethyl) phosphite, dibenzyl phosphite, monobenzyl phosphite, n-butyl cresyl phosphite, didodecyl phosphite, di-tetrahydrofurfuryl phosphite, difuryl phosphite.

The aromatic amine can be represented by the formula

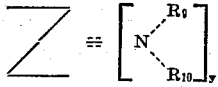

wherein Z is an aromatic nucleus containing one or more separate or condensed aromatic rings, such as benzene and naphthalene rings, the nitrogen atom being attached to the ring as a substituent, or constituting a ring atom in a heterocylic ring, which may itself be saturated or unsaturated, or even aromatic, and wherein $R_9$ and $R_{10}$ are present depending on the number of valences of the nitrogen unattached to the ring. $R_9$ and $R_{10}$ can each be hydrogen or aliphatic alkyl, aryl, alkaryl, aralkyl or cycloalkyl hydrocarbon groups containing from one to thirty carbon atoms. Preferably, each of $R_9$ and $R_{10}$ contains from one to ten carbon atoms. Where the nitrogen is part of a heterocyclic group, $R_9$ and $R_{20}$ can be taken together as in the case of N-phenyl piperidine, or one of the R's can be linked to the aromatic nucleus, as in the case of 2,2,3-trimethyl dihydroquinoline.

In the general formula, $y$ can be any integer from one to the maximum number of available positions for substituents on the aromatic nucleus, usually six or eight per nucleus. the aromatic nucleus can also contain other substituents not reactive with halogen containing resins. Thus, for example, there can be hydrocarbon groups containing from one to about thirty carbon atoms such as aliphatic groups, for example, alkyl and alkenyl; aromatic groups, for example, phenyl, alkaryl and aralkyl groups; and cycloaliphatic groups, for example, cycloalkyl; hydroxy aminophenols; halogen; alkoxy OR' or acyl

where R' is alkyl, aryl or hydrogen.

Representative aryl amines includes the following:

Isopropoxydiphenylamine, aniline, N-methyl aniline, phenyl-beta-naphthylamine, N-benzyl aniline, diphenylamine, phenyl-alpha-naphthylamine, dioctyl diphenylamine-acetone and butyraldehyde-aniline condensation product, p-(p-tolyl-sulfonylamido)-diphenylamine,
di-p-methoxy-diphenylamine,
p-phenylenediamine,
N,N'-diphenyl-p-phenylenediamine,
di-beta-naphthyl-p-phenylenediamine,
N-cyclohexyl-N'-phenyl-p-phenylenediamine,
dioctyl-p-phenylenediamine,
N,N'-diphenylethylenediamine,
N,N'-diortho-tolylethylenediamine,
diphenylpropylenediamine,
N,N'-disec-butyl-p-phenylenediamine,
diaminodiphenylmethane,
N-isopropyl-N'-phenyl-p-phenylenediamine,
m-toluene diamine,
6-phenyl-2,2,4-trimethyldihydroquinoline,
6-ethoxy-2,2,4-trimethyldihydroquinoline,
2,6-diethyl-2,3,4-trimethyldihydroquinoline,
2,2,4-trimethyldihydroquinoline (monomer or polymerized);
p-aminophenol,
o-hydroxy-p-phenylene diamine,
p-hydroxy-o-phenylene diamine,
o-amino phenol,
o-hydroxy-p-toluidine,
p-hydroxy-o-toluidine.

The invention is applicable to any polyvinyl chloride resin. The term "polyvinyl chloride" as used herein is inclusive of any polymer formed at least in part of the recurring group

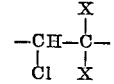

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene. Among the polyvinyl chlorides which can be stabilized are the uniaxially-stretch oriented polyvinyl chloride described in U.S. Patent No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about 20 to about 150 carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

The amount of organotin moiety, mercapto acid moiety, and antioxidant employed is sufficient to impart the stabilizing effect desired. A polyvinyl chloride resin composition which is to be subjected to high temperatures will ordinarily require a larger amount of the stabilizing combination of the invention. An amount of antioxidant and of mercapto acid moiety of as little as 0.01 part by weight each per 100 part of polyvinyl chloride resin will enhance the stabilizing effect of the organotin compound, and such amounts together with an amount of organotin compound as little as 0.25 part by weight per 100 parts of polyvinyl chloride resin will, in general, give a polyvinyl chloride resin composition stable at temperatures up to 350° F. or higher. There is no critical upper limit on the amount of antioxidant, mercapto acid moiety, or organotin compound. At amounts beyond about 2 parts of antioxidant, about 2 parts mercapto acid moiety, and about 10 parts of organotin compound, per 100 parts of resin, the increase in stabilizing effect may not be commensurate with the amount that is employed, and such amounts accordingly may be wasteful, and uneconomic. However, larger amounts than these can be employed, and may be necessary under some conditions. Preferably, for optimum results, the amounts of antioxidant and mercapto acid moiety are within the range from about 0.01 to about 2 parts, and the amount of organotin compound is within the range from about 0.5 to about 5 parts, by weight per 100 parts of resin.

It will be understood that the amount of the mercapto acid moiety, when a part of the antioxidant or of the organotin compound, will ipso facto be sufficient when a sufficient amount of either is employed, in view of these stated proportions.

The stabilizing combination of this invention can, if desired, be employed in conjunction with other stabilizers for polyvnyl chloride resins, such as, for example, organic compounds containing at least one epoxy group. Typical organic epoxy compounds are described in U.S. Patent No. 2,997,454, the disclosure of which is hereby incorporated by reference. Such additional stabilizers can be used where special stabilization effects are desired.

The stabilizer combinations of the invention are effective light stabilizers when used with polyvinyl chloride resins as the sole stabilizer. Their effectiveness is particularly evidenced by an improved resistance to discoloration upon exposure to sunlight for long periods of time. They can also be used in conjunction with other ultraviolet absorbers or light stabilizers, wherein they are effective in supplementing the light stabilizing effects contributed by the other stabilizers without disadvantageously affecting the desirable properties of the polymer. In many cases, an enhanced or synergistic effect is observed.

Stabilizer compositions containing the stabilizer combination of the invention, an organotin compound having at least one organic radical linked to tin through carbon, a mercapto acid moiety and an antioxidant, combined with a 2-hydroxy benzophenone or derivative thereof, are useful for light stabilization. A benzophenone is effective that has a 2-hydroxy benzophenone nucleus, i.e., a nucleus of the structure

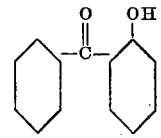

This nucleus is inclusive of the compound 2-hydroxy benzophenone, and derivatives thereof bearing substituent groups attached to any of the ring carbon atoms of the nucleus.

The preferred benzophenones, containing a nucleus of the above structure, have the following formula

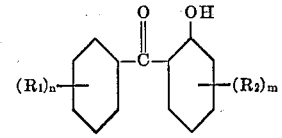

wherein $n$ is an integer from 1 to 5 and $m$ is an integer from 1 to 4 and the R radicals are selected from the group consisting of hydroxyl, halogen (such as fluorine, chlorine, bromine and iodine, and preferably chlorine or bromine) and organic radicals are selected from the group consisting of aliphatic, alicyclic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aryl, alkaryl, aralkyl, alkoxy, aryloxy, alkaryloxy, aralkoxy oxyalkylene, hydroxyalkyl, and hydroxyalkylene radicals, and esters thereof with organic carboxylic acids. These radicals may, if desired, contain inert, nonreactive substituents such as halogen and other carbocyclic and heterocyclic ring structures and up to a total of three R-radicals are hydroxyl.

Within the above limitations, the R-radicals substituted on any ring or on different rings can be the same or different.

Typical organic radicals are, for example, methyl, ethyl, propyl, isopropyl, butyl, isobutyl, t-butyl, amyl, isoamyl, n-octyl, isooctyl, 2-ethylhexyl, t-octyl, decyl, tertnonyl, tert-heptyl, undecyl, dodecyl, pentadecyl, octadecyl, tricosyl, and nonacosyl; allyl, hexenyl, linoleyl, ricinoleyl, oleyl, undecadienyl, 12-octadecenyl, propynyl, methoxy, n-butoxy, n-octyloxy, 2-ethylhexyloxy, n-decyloxy, benzyloxy, acetoxy, benzoyloxy; hexynyl, undecynyl; monochloroethyl, dichloroethyl, monobromopropyl, tribromopropyl, fluoroheptyl, chlorododecyl, chlorododecenyl, chlorododecynyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxyundecynyl, glyceryl, sorbityl, pentaerythrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. Exemplary of such acids are acetic, propionic, butyric, valeric, hexanoic, ethylheptanoic, n-octanoic, isooctanoic, capric, undecanoic, lauric, myristic, palmitic, stearic, oleic, ricinoleic, behenic, chlorocaproic and hydroxycapric acids.

Typical benzophenones are the following: 2-hydroxy benzophenone, 2-hydroxy-4-parabromo-benzophenone, 2-hydroxy-4-methyl-benzophenone, 2,4 - dihydroxy-4'-tertiary-butyl-benzophenone, 2,4,4'-trihydroxy-benzophenone, 2-hydroxy-4-methoxy-4' - tertiary-butyl-benzophenone, 2-hydroxy-4-decyloxy - benzophenone, 2-hydroxy-4-heptyloxy-3',4'-dimethyl-benzophenone, 2,2'-dihydroxy - 4-(2-ethylhexyloxy)benzophenone, 2 - hydroxy-4-benzyloxy-4'-tertiary-butyl-benzophenone, 2 - hydroxy-4,4'-dimyristoyloxy-benzophenone, 2 - hydroxy-4-(o-chlorobenzoyloxy)-benzophenone, 2-hydroxy - 4 - iodo-benzophenone, 2-hydroxy-4-(pentachloro - benzyloxy)benzophenone, 2 - hydroxy - 4 - benzyloxy-benzophenone, 2 - hydroxy-4,5-dimethyl-benzophenone, 2 - hydroxy-4-benzyloxy-5-chlorobenzophenone, 2 - hydroxy-5-hexyl-2',4'-dimethylbenzophenone, 2-hydroxy-4-(3,4-dichlorobenzyloxy)-4'-t-butylbenzophenone, 2-hydroxy-3-methyl-4'-nitrobenzophenone, 2-hydroxy-(4-hexyl)-benzophenone, 2-hydroxy-4-benzyloxy-2',4',5'-trichlorobenzophenone, 2-hydroxy-(4-ethyl)-3'-chlorobenzophenone, 2,4 - dihydroxy - benzophenone, 2,2',4-trihydroxybenzophenone and 4-n-decycloxy - 2,2'-dihydroxybenzophenone.

Also useful light stabilizers which can be employed are the 2,4,6-derivatives of 1,3,5-trithiane containing hydroxyl groups having a phenolic character

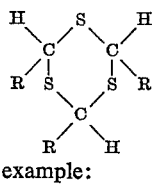

R may represent, for example:

(1)  4-hydroxy-phenyl (2) 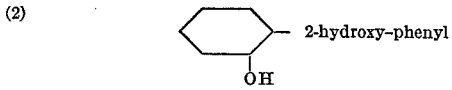 2-hydroxy-phenyl (3) 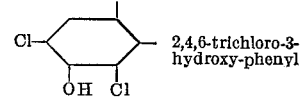 2,4,6-trichloro-3-hydroxy-phenyl (4) 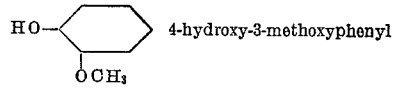 4-hydroxy-3-methoxyphenyl (5) 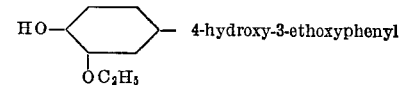 4-hydroxy-3-ethoxyphenyl (6) 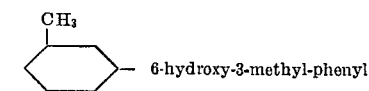 6-hydroxy-3-methyl-phenyl (7) 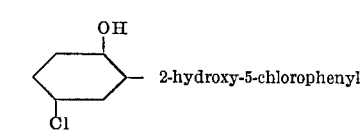 2-hydroxy-5-chlorophenyl The o-hydroxy-phenylbenzotriazoles also can be used. These have the formula:

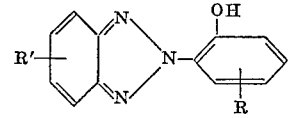

wherein R and R' are selected from the group consisting of hydrogen, hydrocarbon and oxyhydrocarbon radicals.

In the formula, the permissible R and R' substituents are numerous and varied. R and R', as stated, may each be hydrogen, in which case the compound is o-hydroxyphenylbenzotriazole, or each may be a hydrocarbon or oxyhydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxyhydrocarbon radicals are methoxy ethoxy, propoxy, isopropoxy and the like.

Exemplary are: 2-(2'-hydroxy-5'-methylphenyl) benzotriazole, 5,6 - dichloro - 2 - (2'-hydroxy-5'-tertiary-butylphenyl) benzotriazole, 5-methyl - 2 - (2'-hydroxy-3',5'-dichlorophenyl) benzotriazole.

The 1-dioxides of α,β-benzoisothiazolone or saccharine can also be used:

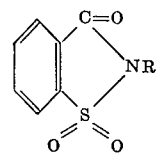

where R is hydrogen or an alkyl, aryl or alkylaryl group of from one to twelve carbon atoms, such as 2-methyl saccharine, 2-ethyl saccharine, 2-dodecyl saccharine, and 2-phenyl saccharine.

The alkyl styryl ketones also are satisfactory. These have the formula

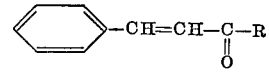

where R is an alkyl or aryl radical having from one to eight carbon atoms, such as benzalacetone, ethyl styryl ketone, and 2,4-dihydroxyphenyl styryl ketone.

The 2-hydroxy aryl-1,3,5-triazines are useful. These have the formula:

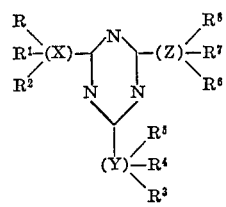

in which X, Y and Z are aromatic radicals, each containing up to three nuclei of six carbon atoms, for example, phenyl, naphthyl or biphenyl, X being substituted by a hydroxy group ortho with respect to the point of attachment to the triazine nucleus, R, $R^1$, $R^2$, $R^3$, $R^4$, $R^5$, $R^6$, $R^7$ and $R^8$ are hydrogen, hydroxyl (preferably in the 2-, 4- and/or 5-position of the aromatic nucleus) alkyl (for example methyl, tertiary-butyl, cyclohexyl, tertiary-octyl, n-octyl and dedecyl), alkoxy (for example, methoxy, n-butoxy, 2-ethylhexyloxy or n-octyloxy, sulfonic or carboxylic acid groups) halogen (for example, iodine, chlorine or bromine), haloalkyl (for example, dichloromethyl or trifluoromethyl) alkylamido (for example, acetamido), mono cyclic arylamide (for example, benzamide and lower monocyclic aryl lower alkyl amides, such as phenylacetamide). Exexplary are, 2,4,6-tris-(2-hydroxy-4-octyloxyphenyl)-triazine-s; 2,4,6-tris-(2,4-dihydroxyphenyl)-triazine-s; 2,4,6 - tris - (2-hydroxy-4-propylphenyl)-triazine-s; 2,4,6-tris-(2-hydroxy-5-methylphenyl)-triazine-s; 2,4-bis-(2,4 - dichlorophenyl) - 6 - (o-methoxyphenyl) - triazine-s; 2,4-bis-(2,4 - dihydroxyphenyl)-6-(o-hydroxyphenyl) - triazine-s; 2-(2,4-dimethylphenyl)-4-(2, 4 - dihydroxyphenyl)-6-(o-hydroxyphenyl)-triazine-s; 2,4, 6-tris-(2 - hydroxynaphthyl - 1)-triazine-s; 2,4,6-tris-(o-hydroxyphenyl)-triazine-s; 2,4 - (2-hydroxy-5-carboxyphenyl)-6-(o-hydroxyphenyl)-triazine-s; 2,4,6-tris-(2-hydroxy-5-chloro)-triazine-s; 2,4,6 - tris - (2,4-dihydroxy-6-hexylphenyl)-triazine-s; 2-(2,4-dihydroxyphenyl)-4,6-diphenyltriazine-s; 2 - (o-hydroxyphenyl)-4,6-bis-(4-methoxyphenyl)-triazine-s; 2,4,6-tris-(2,4-dimethoxyphenyl)-triazine-s, and 2,4 - bis - (2-hydroxy - 4 - methoxyphenyl)-6-(2,4-dimethoxyphenyl)-triazine-s; 2,4 - bis - (2,4-dihydroxyphenyl)-6-(4-methoxyphenyl)-triazine-s.

The dialkylhydroxybenzoic acid derivatives are useful. These have the formula:

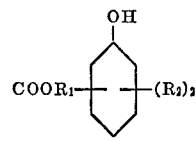

in which $R_1$ is hydrogen or an aryl, alkyl or alkaryl radical, having from one to eighteen carbon atoms, and each $R_2$ is an alkyl radical and at least one R radical has a branched chain at an α-carbon atom, as for example in a secondary or tertiary alkyl radical. Preferably, each R has from three to eight carbon atoms. Exemplary are 3 - methyl - 5-isopropyl-4-hydroxybenzoic acid, 3-ethyl-5-tertiarybutyl - 4 - hydroxybenzoic acid, 3-pentyl-5-tertiary - octyl - 4-hydroxybenzoic acid, t-butylphenyl-5-t-butyl salicylate, and nonylphenyl 5-chloro salicylate.

In the preferred stabilizers of this group each R substituent has a branched chain at the α carbon atom. Exemplary are 3,5-diisopropyl-4-hydroxybenzoic acid, 3-isopropyl-5-tertiarybutyl-4-hydroxybenzoic acid, 3,5-di-tertiary - butyl-4-hydroxybenzoic acid, 3-cyclohexyl-5-tertiary-butyl-4-hydroxybenzoic acid, 3-5-dicyclohexyl-5-tertiary-butyl-4-hydroxybenzoic acid, 3,5-di-cyclopentyl-4-hydroxybenzoic acid, 3,5-di-tertiary-octyl-4-hydroxybenzoic acid.

The most preferred compounds are those in which each R is a tertiary alkyl with at most eight carbon atoms, for example, 3,5-di-tertiary-butyl-4-hydroxybenzoic acid.

The triazines having the following formula can also be employed:

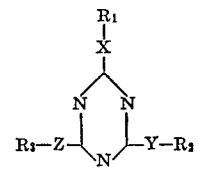

where $R_1$ and $R_2$ represent an alkyl group of from one to eighteen carbon atoms, for example, methyl, ethyl, propyl, butyl, pentyl, octyl, dodecyl and octadecyl, a cycloalkyl group of five to six carbon atoms, for example, cyclopentyl or cyclohexyl, a phenyl group or an alkyl phenyl group of from seven to twenty-four atoms, for example methylphenyl, ethylphenyl, butylphenyl, octylphenyl, octadecylphenyl, dimethylphenyl, dibutylphenyl and dioctadecylphenyl, an alkoxyalkyl group of from three to fifteen atoms, for example methoxymethyl, ethoxyethyl, butyoxyethyl, n-lauryloxy-ethyl, or an alkoxyphenyl group of from seven to nineteen carbon atoms, for example methoxyphenyl, ethoxyphenyl, n-octyloxyphenyl or n-lauryloxyphenyl. $R_3$ designates an alkyl hydroxyphenyl of from seven to twenty-four carbon atoms, for example, methylhydroxyphenyl, ethylhydroxyphenyl, butylhydroxyphenyl, octylhydroxyphenyl, octadecylhydroxyphenl, di-t-butylhydroxyphenyl, methyl-di-t-butylhydroxyphenyl. X, Y and Z each designate a sulfur or oxygen atom or a substituted or unsubstituted imino group, preferably arylalkyl imino, for example, benzylimino.

An additional class of triazines has the formula:

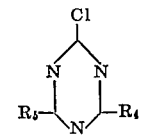

in which $R_4$ represents an alkylhydroxyanilino group, preferably one having seven to twenty-four carbon atoms, for example methylhydroxyanilino, ethylhydroxyanilino, butylhydroxyanilino, octylhydroxyanilino, dodecylhydroxyanilino, octadecylhydroxyanilino, di-t-butylhydroxyanilino and methyl-di-t-butylhydroxyanilino, or an alkyl thioalkoxy group, preferably having from one to eighteen carbon atoms, for example, thiomethyl, thioethyl, thiopropyl, thiobutyl, thiooctyl, thiododecyl and thiooctadecyl, and $R_5$ represents an alkylhydroxyaniline group, preferably one corresponding to the definition of $R_4$.

Exemplary compounds coming within one or both of the above triazine formulae are 6-(4-hydroxy-3,5-di-t-butylanilino) - 2,4-bis-(n-thiooctyl)-1,3,5-triazine; 6-(4-hydroxy - 3,5 - di-t-butylanilino) - 2,4-bis-thiophenyl-1,3, 5-triazine; 6 - (4 - hydroxy - 3,5 - di - t - butylanilino)-2,4-bis-thiooctadecyl - 1,3,5 - triazine; 6 - (4 - hydroxy - 3,5-di-t - butylanilino)-2,4-bis-thio-cyclohexyl-1,3,5-triazine; 6-(2-hydroxy-3,5-di-t-butyl - 6 - methylanilino), 2,4 - bis-n-thiooctyl) - 1,3,5-triazine; 6-(4-hydroxy - 3,5-di-t-butylanilino) - 4-n-thiooctyl-2-chlor-1,3,5-triazine; 4,6-bis-(4-hydroxy-3,5,-di-t-butylanilino)-2-chlor-1,3,5-triazine.

Additional light stabilizers which can be used include: 2,4,6, - tris - 2-hydroxyphenyl-1,3,5-trithiane, 2,4,6,-tris-2-hydroxyphenyl-1,3,5-triazine, 2,4-dihydroxyphenyl furyl ketone, 2,2' - dihydroxy-4,4'-diethoxybenzil, 2-hydroxy benzaldehyde bis(n - dodecylmercaptal, tri-n-dodecylphosphoramide, tri - cyclohexyl-phosphoramide, hexamethyl - phosphoramide, octamethyl-pyrophosphoramide, 2-cyano-3-p-dodecylanilino acrylonitrile, 2-ethylhexyl(2-cyano - 3 - N-methylanilino)acrylate, 2-ethylhexyl(4-hydroxy - 3,5 - di-tertiary-butyl-α-cyano-cinnamate,n-butyl (β - phenyl - α-cyanocinnamate), 2-(4-hydroxy 3-methylphenyl) benzotriazole oxide.

A light stabilizer or light stabilizer combination of any two or more light stabilizers, which can be selected from the same or different classes, as noted above, would be used in an amount from 0.01 to about 5 parts by weight per 100 parts of resin, preferably from 0.05 to 2 parts by weight, for optimum results.

Should the stabilizer or stabilizer-light stabilizer combination of the invention be employed together with still other polyvinyl chloride resin stabilizers, the amount of the stabilizer combination of the invention together with the other stabilizer will be sufficient to impart the desired stabilizing effect. The stabilizer combination of the invention in such event will be the major stabilizer, and the additional stabilizer will supplement the stabilizing action of the former, the amount of the stabilizer combination being within the range from about 0.2 to about 15 parts by weight per 100 parts of the resin, and the additional stabilizer being in an amount of from about 0.05 to about 10 parts per 100 parts of the resin.

Example 1

A series of rigid (nonplasticized) formulations was prepared having the following composition:

Plastic composition: Parts by weight
Diamond 450 (homopolymer of vinyl chloride) _____ 150
Stearic acid _____ 2.25
Stabilizer, as shown in Table I.

The stabilizer was added in the proportions noted in Tables I and II and was blended with the polyvinyl chloride and the mixture was fused on a two-roll mill and sheeted off. Samples were cut from the sheet and heated in an oven at 375° F. for two hours to determine heat stability. Samples were withdrawn at fifteen minute intervals, and the discoloration was noted, and the color is reported in Table I below.

TABLE I
[375° F.]

| Time of Heating | Composition Number | | | |
|---|---|---|---|---|
| | A | B | C | D |
| | Stabilizing Composition | | | |
| | 0.5 part 2,6-di-tert-butyl-4-methyl-phenol | 2.0 parts dibutyl tin-di(thiomalate) | 2.0 parts of a mixture of 12.5 parts dibutyl tin oxide and 5 parts thiomalic acid | 1.5 parts of a mixture of 12.5 parts dibutyl tin oxide and 5 parts thiomalic acid; 0.5 part of 2,6-di-tert-butyl 4-methyl-phenol |
| | Color | Color | Color | Color |
| Initial | Colorless | Colorless | Colorless | Colorless. |
| After 15 min | Red | Very pale yellow | Very pale yellow | Do. |
| After 30 min | Dark brown | do | Pale yellow | Very pale yellow. |
| After 45 min | | Pale yellow | Yellow | Do. |
| After 60 min | | Yellow | do | Do. |
| After 75 min | | do | Deep yellow | Pale yellow. |
| After 90 min | | Deep yellow | do | Light yellow. |
| After 105 min | | do | Brown | Brown. |
| After 120 min | | Charred | Charred | Dark Brown. |

| Time of Heating | Composition Number | | |
|---|---|---|---|
| | E | F | G |
| | Stabilizing Composition | | |
| | 1.3 parts of a mixture of 12.5 parts dibutyl tin oxide and 5 parts thiomalic acid; 0.7 part of 2,6-di-tert-butyl-4-methyl phenol | 1.0 part of a mixture of 12.5 parts dibutyl tin oxide and 5 parts thiomalic acid; 1.0 part of 2,6-di-tert-butyl-4-methyl phenol | 1.5 parts of a mixutre of 12.5 parts dibutyl tin oxide and 5 parts thiomalic acid; 0.5 part di(nonyl phenyl) phosphite |
| | Color | Color | Color |
| Initial | Colorless | Colorless | Colorless. |
| After 15 min | Very pale yellow | Very pale yellow | Very pale yellow. |
| After 30 min | do | do | Pale yellow. |
| After 45 min | Pale yellow | Pale yellow | Do. |
| After 60 min | do | Yellow | Yellow. |
| After 75 min | Light yellow | Brown | Brownish yellow. |
| After 90 min | Yellow | do | Orange. |
| After 105 min | Brown | do | Brown. |
| After 120 min | Dark brown | Dark brown | Dark brown. |

A small amount, usually not more than 1.5% of a parting agent also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

The preparation of the stabilized composition is easily accomplished by conventional procedures. The selected stabilizer combination ordinarily is mixed with the plasticizer, if any be used, and this then is blended with the polyvinyl chloride resin, using for instance, plastic mixing rollers, at a temperature at which the mix is fluid and thorough blending facilitated, milling the plasticizer and stabilizer with the resin on a 2-roll mill at from 250 to 350° F. for a time sufficient to form a homogenous sheet, five minutes, usually. After the mass is uniform, it is sheeted off in the usual way.

The following examples in the opinion of the inventors represent preferred embodiments of polyvinyl chloride resin stabilizer compositions of their invention, and their use with polyvinyl chloride resins, and exhibit the synergistic effect obtained thereby.

The results clearly indicate that at 375° F. the stabilizer compositions of this invention, exemplified by Compositions D to G, have a stabilizing effect upon polyvinyl chloride resins which is better than that of a typical sulphur-containing organotin stabilizer compound, dibutyl tin dithiomalate, illustrated by Composition B, or a mixture of dibutyl tin oxide plus thiomalic acid, illustrated by Composition C.

Compositions A, B and C together clearly indicate as controls the synergistic effect obtained in D to F by means of this invention. Thus, the result obtained with either A, 2,6-di-tert-butyl-4-methyl phenol alone, or B, dibutyl tin-bis-(thiomalate) alone, or C, dibutyl tin oxide and thiomalic acid together, are in no way comparable to the very favorable results obtained when both A and C are employed together, as in D to F, inclusive.

Composition G shows that a phosphite, di (nonyl phenyl) phosphite, is the equivalent of a phenol in the same amount (Composition D).

Example 2

This example illustrates the use of varying amounts of phenol, organotin compound and mercapto acid in the stabilizer combination. The procedure of Example 1 was followed, with testing being carried out at 375° F. Results are tabulated in Table II.

Plastic composition: Parts by weight
- Diamond 450 (polyvinyl chloride homopolymer) — 150
- Stearic Acid — 2.25
- Dibutyl tin oxide 2.5 parts — (¹)
- Thiomalic acid 5 parts — (¹)
- Phenol (2,6-(di-t-butyl-4-methyl-phenol)) — (¹)
- Phosphite (diphenyl phosphite) — (¹)

¹ Amount shown in Table II.

The results indicate that the proportions of the stabilizers added to the composition may be varied widely, for excellent stabilization.

Example 4

In accordance with the procedure of Example 1, the following ingredients were compounded and tested at 350° F. The colors obtained are reported in Table IV.

Plastic composition: Parts by weight
- Geon 103 Ep (homopolymer of vinyl chloride) — 150
- Mineral oil — 1.5
- Dibutyl tin thioglycolate — 1.5
- Antioxidant, as indicated.

As in the case of the preceding examples, Compositions V to W exhibited good stability at 350° F., in contrast to U, which contained no antioxidant.

TABLE II
[375° F.]

| Composition Number | H | I | J | K | L | M | N | O |
|---|---|---|---|---|---|---|---|---|
| Parts of phenol | | 0.5 | 0.1 | 0.2 | 0.3 | 0.5 | | |
| Parts of phosphite | | | | | | | 0.5 | 0.5 |
| Parts of organotin-thiomalic acid mixture | 2.0 | | 1.9 | 1.8 | 1.7 | 1.5 | | 1.5 |
| Time of Heating | Color | Color | Color | Color | Color | Color | Color | Color |
| Initial | Colorless | Colorless | Colorless | Colorless | Colorless | Colorless | Colorless | Colorless. |
| After 15 min | Very pale yellow. | Red | Very pale yellow. | Very pale yellow. | Very pale yellow. | Very pale yellow. | Very pale yellow. | Very pale yellow. |
| After 30 min | Pale yellow | Black and charred. | Pale yellow | Pale yellow | Pale yellow | Pale yellow | Red | Pale yellow. |
| After 45 min | Light yellow | do | Light yellow | Light yellow | Light yellow | Light yellow | Charred | Do. |
| After 60 min | Dark yellow | do | do | do | do | do | do | Light yellow. |
| After 75 min | Charred | do | Yellow | Yellow | Yellow | Yellow | do | Yellow. |
| After 90 min | do | do | Brown | Brown | Brown | Brown | do | Brown. |
| After 105 min | do | do | do | do | do | do | do | Do. |
| After 120 min | do | do | do | do | do | do | do | Do. |

Example 3

The following materials were prepared in accordance with the procedure of Example 1 and tested for stability at 375° F. Colors are reported in Table III.

Plastic composition: Parts by weight
- Diamond 450 (homopolymer of vinyl chloride) — 150
- Stearic acid — 2.25
- Dibutyl tin oxide (12.5 parts); thiomalic acid (5 parts) — 2.0
- Phosphorus acid or phosphite listed in Table III — 0.10

The tabulated results indicate the superior stabilizing action imparted to polyvinyl chloride by means of this invention. Compositions Q to T using the combination of this invention, containing a phosphite as the anti-oxidant, were stabilized against heat deterioration better than Composition P which contained the organotin oxide and thiomalic acid alone.

TABLE IV
[350° F.]

| | Composition Number | | |
|---|---|---|---|
| | U | V | W |
| Time of Heating | Antioxidant | | |
| | None | Isooctyl diphenyl phosphite; 0.5 part | Diphenyl phosphite, 0.1 part |
| | Color | Color | Color |
| Initial | Pale pink | Colorless | Colorless. |
| After 15 min | Pale yellow | do | Very pale yellow. |
| After 30 min | do | Very pale yellow | Do. |
| After 45 min | Yellow | do | Pale yellow. |
| After 60 min | do | Pale yellow | Do. |
| After 75 min | do | do | Do. |
| After 90 min | Dark yellow | do | Light yellow. |
| After 105 min | do | do | Do. |
| After 120 min | Very dark yellow | Light yellow | Do. |

TABLE III
[375° F.]

| | Composition Number | | | | |
|---|---|---|---|---|---|
| | P | Q | R | S | T |
| Time of Heating | Phosphorus compound | | | | |
| | None | Diphenyl phosphite | Isooctyl diphenyl phosphite | Sodium dihydrogen phosphite | Phosphorous acid |
| | Color | Color | Color | Color | Color |
| Initial | Colorless | Colorless | Colorless | Colorless | Colorless. |
| After 15 min | Very pale yellow | Very pale yellow | Very pale yellow | Very pale yellow | Very pale yellow. |
| After 30 min | do | do | do | do | Do. |
| After 45 min | Pale yellow | Pale yellow | Pale yellow | Pale yellow | Pale yellow. |
| After 60 min | do | do | do | do | Do. |
| After 75 min | Yellow | do | Yellow | Light yellow | Light yellow. |
| After 90 min | Dark yellow | do | do | do | Do. |
| After 105 min | Black | Yellow | Dark Yellow | Dark yellow | Yellow. |
| After 120 min | do | Dark yellow | Brown | Brown | Dark yellow red. |

Example 5

The procedure of Example 1 was repeated, using as the resin 127.5 parts of "Vinylite VYHH," a copolymer of 87% vinyl chloride and 13% vinyl acetate, and 22.5 parts of "Vinylite VYNS," a copolymer of 90% vinyl chloride and 10% vinyl acetate. The stabilizer combination employed was 2.0 parts of dibutyl tin bis-(thiomalate) and 0.5 part of 2,6-di-t-butyl-4-methyl phenol. The resulting composition remained colorless for a substantial period of time and had only yellowed slightly at the end of two hours of heating at 300° F., indicating that the stabilizer combinations of this invention are also effective with copolymers of vinyl chloride.

Example 6

To show the effect of a conventional plasticizer on the compositions of this invention, the following materials were blended as in Example 1 and tested for heat stability at 350° F.

Plastic composition: Parts by weight
Geon 101 Ep (polyvinyl chloride homopolymer) _____ 100
Dioctyl phthalate (plasticizer) _____ 50
Dibutyl tin oxide (12.5 parts); thiomalic acid (5.0 parts) _____ 2
Antioxidant as noted in Table VI.

The results tabulated in Table VI show that compositions X and Y containing the stabilizer combination of this invention retain their light color for a long period of time.

TABLE VI
[350° F.]

| | Composition Number | |
|---|---|---|
| | X | Y |
| Time of Heating | Antioxidant | |
| | 0.5 part diphenyl phosphite | 0.75 part 4,4'-butylidene-bis-(2-t-butyl-5-methyl-phenol) |
| | Color | Color |
| Initial | Colorless | Colorless. |
| After 15 min | do | Do. |
| After 30 min | Very pale yellow | Very pale yellow. |
| After 45 min | do | Do. |
| After 60 min | Pale yellow | Pale yellow. |
| After 75 min | do | Do. |
| After 90 min | Yellow | Yellow. |
| After 105 min | do | Do. |
| After 120 min | Brown | Do. |

Example 7

The procedure of Example 1 was following using different stabilizer combinations as noted and testing the compositions at 375° F. Results are indicated in Table VII.

Plastic composition: Parts by weight
Diamond 450 (polyvinyl chloride homopolymer) _____ 150
Stearic acid _____ 2.25
Stabilizer, as noted in Table VII.

The results indicate that good stabilization may be obtained with many different organotin compounds used in conjunction with a phenol.

TABLE VII
[375° F.]

| | Composition Number | | |
|---|---|---|---|
| | AA | BB [1] | CC |
| Time of Heating | Organotin Compound | | |
| | 4.65 parts dibutyl tin oxide; 1.85 parts thiomalic acid; 3.5 parts 2,6-ditert-butyl-4-methyl phenol | 3.0 parts dibutyl tin distearate; 0.37 part thiomalic acid; 0.7 part 2,6-ditert-butyl-4-methyl phenol | 2.0 parts dibutyl tin bis-thiomalate; 1.0 part 2,6-di-tert-butyl-4-methyl phenol |
| | Color | Color | Color |
| Initial | Colorless | Colorless | Colorless. |
| After 15 min | Very pale yellow | Very pale yellow | Very pale yellow. |
| After 30 min | do | do | Do. |
| After 45 min | Pale yellow | Pale yellow | Pale yellow. |
| After 60 min | do | do | Do. |
| After 75 min | Yellow | Yellow | Light yellow. |
| After 90 min | Brown | Brown | Yellow. |
| After 105 min | do | do | Brown. |
| After 120 min | do | do | Do. |

[1] Stearic acid was omitted in this example.

Example 8

A polyvinyl chloride homopolymer formulation was prepared having the following composition:

Plastic composition: Parts by weight
Diamond 450 (homopolymer of polyvinyl chloride) _____ 150
Montan wax _____ 0.75
Dibutyl tin oxide (4.65 parts); thiomalic acid (1.85 parts); 2,6-di-tert-butyl-4-methyl phenol (3.5 parts) _____ 2.0

The wax and stabilizers were mixed together and then blended with the polyvinyl chloride in a Brabender plastograph at 300° F., and mixing continued while viscosity increase was plotted against time as gram-meters of torque. Viscosity reached a peak at 4700 gram-meters after 25 minutes of heating, and thereafter decreased, showing the resin had been stabilized against further increase in viscosity. In contrast, a conventionally stabilized polymer continued to increase in viscosity after 4700 gram-meters showing the superiority of the stabilizer system of the invention.

Samples of the resin were heated in an oven at 375° F., to test heat stability. Results were as follows:

TABLE VIII.—COMPOSITION NO. Z
[375° F.]

| Time of heating, min.: | Color |
|---|---|
| Initial | Colorless. |
| After 15 | Very pale yellow. |
| After 30 | Do. |
| After 45 | Pale yellow. |
| After 60 | Do. |
| After 75 | Light yellow. |
| After 90 | Yellow. |
| After 105 | Brown. |
| After 120 | Brown. |

Example 9

A polyvinyl chloride polymer formulation was prepared having the following composition:

Plastic composition: Parts by weight
  Geon 103 Ep (homopolymer of vinyl chloride) _ 240
  Du Pont LD 313 (a chlorinated polyethylene containing approximately 38% chlorine) ___ 60
  Isooctyl epoxystearate _____ 10

The composition was then divided into two equal parts. To one, 2.0 parts of dibutyl tin-(bis-thiomalate) and 0.5 part of 2-tert-butyl-4-methoxyphenol were added. To the other composition 2.0 parts of dibutyl tin oxide, 0.8 part of thiomalic acid and 0.5 part of the phenol were added.

Both compositions, which were colorless, were then heated at 375° F. for two hours. At the end of this time, both compositions were substantially identical in their light yellow color.

This example illustrates the fact that the invention is applicable to mixtures of polymers in which polyvinyl chloride is predominant.

Example 10

Two polyvinyl chloride polymer formulations were prepared, having the following composition:

| Plastic Composition | Parts by Weight | |
|---|---|---|
| | Control | Example 10 |
| Polyvinyl chloride homopolymer (prepared by the suspension polymerization process) | 100 | 100 |
| Dibutyltin bis (isooctyl thioglycolate) | 3 | 3 |
| 2,6-di-tertiary-butyl-p-cresol | | 0.5 |
| Stearic acid | 0.5 | 0.5 |

In each case, the stearic acid and stabilizers were mixed together and then blended with the polyvinyl chloride, and the mixture was fused on a two-roll mill, milling for five minutes at 340 to 350° F. and sheeted off to a thickness of 20 mils. Samples 1 inch by 2 inches were cut from the sheet, and exposed to strong sunlight at the Desert Sunshine Exposure Test Station in Phoenix, Ariz., for eight months. The samples were exposed to direct sunlight on racks supported by aluminum frames facing south at an angle of 45° from the horizontal. Swatches were taken every two months, and examined for discoloration and embrittlement. The extent of exposure is reported in months and langleys, a measure of the total solar energy falling on the samples. One langley is equivalent to one calorie per square centimeter. The condition of the samples at the two-month intervals was recorded as follows:

TABLE IX

| | Color | |
|---|---|---|
| | Control | Example 10 |
| Before exposure | Colorless | Colorless. |
| After exposure for: | | |
| 2 months (30,960 langleys) | Pale yellow | Pale yellow. |
| 4 months (65,145 langleys) | Light grayish yellow | Light yellow. |
| 6 months (100,555 langleys) | Gray | Light gray. |
| 8 months (132,790 langleys) | Black | Brown. |

It is apparent that the stabilizer formulation of the invention imparts a high degree of light stability to the polyvinyl chloride resin, as compared to the control, without an antioxidant, (the phenol) and with the organotin compound as the sole stabilizer.

The Example 10 composition was also found to be heat stable when subjected to heating at 350° F. in an oven. The formulation underwent no significant color change, after ninety minutes of exposure.

Example 11

Two polyvinyl chloride resin formulations were prepared having the following composition:

| Plastic Composition | Parts by Weight | |
|---|---|---|
| | Control | Example 11 |
| Polyvinyl chloride homopolymer (prepared by the suspension polymerization process) | 100 | 100 |
| Dibutyltin bis (isooctyl maleate) | 2 | 2 |
| Dibutyltin bis(isooctyl thioglycolate) | 1 | 1 |
| 2,6-di-tertiary-butyl-p-cresol | | 0.5 |
| Stearic acid | 0.5 | 0.5 |

The stearic acid and stabilizers were mixed together and then blended with the polyvinyl chloride, and the mixture was fused on a two-roll mill at 340 to 350° F. for five minutes, and sheeted off to a thickness of 20 mils. Samples 1 inch by 2 inches were cut from the sheet and exposed to strong sunlight at the Desert Sunshine Exposure Test Station in Phoenix, Ariz. for eight months. The samples were exposed to direct sunlight on racks supported by aluminum frames facing south at an angle of 45° from the horizontal. Swatches were examined every two months for discoloration and embrittlement. The extent of exposure is reported in months and langleys. The condition of the sample at two-month intervals was noted and recorded as follows:

TABLE X

| | Color | |
|---|---|---|
| | Control | Example 11 |
| Before exposure | Colorless | Colorless. |
| After exposure for: | | |
| 2 months (30,960 langleys) | Pale yellow | Very pale yellow. |
| 4 months (65,145 langleys) | Light greenish yellow | Do. |
| 6 months (100,555 langleys) | Medium gray-green | Light gray-green. |
| 8 months (132,790 langleys) | Deep green | Do. |

It is apparent that the stabilizer formulation of the invention imparts a high degree of light stability to the polyvinyl chloride resin, as compared to the control, without an antioxidant (the phenol), and with the organotin compound as the stabilizer.

The Example 11 composition was also found to be heat stable when subjected to heating at 350° F. in an oven. The formulation underwent no significant color change after ninety minutes of exposure.

Example 12

Four polyvinyl chloride resin formulations were prepared having the following formulation:

| Plastic Composition | Parts by Weight | | | |
|---|---|---|---|---|
| | Control A | Control B | Example 10 | Example 12 |
| Polyvinyl chloride homopolymer (prepared by suspension polymerization process) | 100 | 100 | 100 | 100 |
| Dibutyltin bis (isooctylthioglycolate) | 3 | 3 | 3 | 3 |
| 2,6-di-tertiary-butyl-p-cresol | | | 0.5 | 0.25 |
| Stearic acid | 0.5 | 0.5 | 0.5 | 0.5 |
| 2-(2′-hydroxy-5′-methylphenyl)-benzotriazole | | 0.5 | | 0.25 |

The stabilizers were combined with the polyvinyl chloride resin on a two-roll mill, milling each formulation for five minutes at 340 to 350° F. mill temperature to a thickness of 20 mils. The resulting sheets were cut in pieces 1 inch by 2 inches each, and exposed to direct sunlight on racks supported by aluminum frames facing south at an angle of 45° from the horizontal at the Desert Sunshine Exposure Test Station at Phoenix, Ariz. The swatches were examined for discoloration every two months, and the extent of exposure is reported in months and in langleys in the following table:

TABLE XI

| | Color | | | |
|---|---|---|---|---|
| | Control A | Control B | Example 10 | Example 12 |
| Before exposure | Colorless | Very pale pink | Colorless | Colorless |
| After exposure for: | | | | |
| 2 months (30,960 langleys) | Pale yellow | do | Pale yellow | Do. |
| 4 months (65,145 langleys) | Light grayish yellow | do | Light yellow | Very pale tan. |
| 6 months (100,555 langleys) | Gray | Light tan | Light gray | Pale tan. |
| 8 months (132,790 langleys) | Black | do | Brown | Do. |

The data show that the combination of the 2-(2'-hydroxy-5'-methylphenyl) benzotriazole with the heat stabilizer combination of the invention, the 2,6-di-tertiary-butyl-p-cresol and the dibutyltin bis(isooctyl-thioglycolate), greatly improves light stability. The Example 12 formulation is superior to the Example 10 formulation, and very greatly superior to the benzotriazole in combination only with the organotin compound (Control B), and to the organotin compound alone (Control A). There is an apparent enhanced synergistic action due to the combination of the composition of the invention with the benzotriazole light stabilizer.

The Example 12 composition was also found to be heat stable when subjected to heating at 350° F. in an oven. The formulation underwent no significant color change after ninety minutes of exposure.

Examples 13 and 14

Three polyvinyl chloride resin formulations were prepared having the following formulations:

| Plastic Composition | Parts by Weight | | |
|---|---|---|---|
| | Control | Example 13 | Example 14 |
| Polyvinyl chloride homopolymer (prepared by the emulsion polymerization process) | 100 | 100 | 100 |
| Isooctyl epoxystearate | 3 | 3 | 3 |
| Dibutyltin bis(isooctyl thioglycolate) | 0.83 | 0.83 | 0.83 |
| 2,6-di-tertiary-butyl-p-cresol | | 0.125 | 0.33 |
| Calcium 2-ethylhexoate [1] (5% calcium) | 0.07 | 0.07 | 0.07 |
| 2-(2'-hydroxy-5'-methyl-phenyl) benzotriazole | 0.25 | 0.125 | 0.17 |

[1] A storage preservative for the dibutyltin bis(isooctyl thioglycolate) U.S. Patent No. 2,789,963.

The stabilizers were combined with the polyvinyl chloride resin on a two-roll mill, milling each formulation for five minutes at 340 to 350° F. mill temperature to a thickness of 20 mils. The resulting sheets were cut in pieces 1 inch by 2 inches each, and exposed to direct sunlight on racks supported by aluminum frames facing south at an angle of 45° from the horizontal at the Desert Sunshine Exposure Test Station at Phoenix, Ariz. The swatches were examined periodically for discoloration, and the extent of exposure is reported in months and in langleys in the following table:

TABLE XII

| | Color | | |
|---|---|---|---|
| | Control | Example 13 | Example 14 |
| Before exposure | Colorless | Colorless | Colorless |
| After exposure for: | | | |
| 1 month (15,840 langleys) | Bright pink | Very pale pink | Very pale pink |
| 2 months (32,748 langleys) | Very pale pink | Almost colorless | Almost colorless |
| 4 months (64,936 langleys) | do | Colorless | Colorless |
| 6 months (96,803 langleys) | Pale yellow | do | Do. |
| 8 months (131,467 langleys) | do | do | Do. |
| 12 months (197,091 langleys) | do | Almost colorless | Almost colorless |
| 14 months (228,303 langleys) | do | do | Do. |

The appearance of a pink to purplish color after short exposure to light is the result of an interaction between the benzotriazole and certain contaminants present in polyvinyl chloride when prepared by the emulsion process. This color disappears in time, but it will be noted that in the combinations in accordance with the invention, the color disappears more quickly.

It is apparent that the organotin compound and benzotriazole are not nearly so effective (control), as the combination of benzotriazole with the stabilizer of the invention which has an enhanced synergistic activity in imparting stabilization to light.

The test Example 13 and 14 compositions were also found to be heat stable when subjected to heating at 350° F. in an oven. The formulations underwent no significant color change after ninety minutes of exposure.

Examples 15 and 16

Three polyvinyl chloride resin formulations were prepared having the following composition:

| Plastic Composition | Parts by Weight | | |
|---|---|---|---|
| | Control | Example 15 | Example 16 |
| Polyvinyl chloride homopolymer (prepared by the emulsion polymerization process) | 100 | 100 | 100 |
| Isooctyl epoxystearate | 3 | 3 | 3 |
| Dibutyltin bis (isooctyl thioglycolate) | 0.83 | 0.83 | 0.83 |
| 2,6-di-tertiary-butyl-p-cresol | | 0.125 | 0.33 |
| Calcium 2-ethylhexoate [1] (5% calcium) | 0.07 | 0.07 | 0.07 |
| 2-hydroxy-4-methoxy benzophenone | 0.25 | 0.125 | 0.17 |

[1] A storage preservative for the dibutyltin bis(isooctyl thioglycolate) U.S. Patent No. 2,789,963.

The stabilizers were combined with the polyvinyl chloride resin on a two-roll mill, milling each formulation for five minutes at 340 to 350° F. mill temperature to a thickness of 20 mils. The resulting sheets were cut in pieces 1 inch by 2 inches each, and exposed to direct sunlight on racks supported by aluminum frames facing south at an angle of 45° from the horizontal at the Desert Sunshine Exposure Test Station at Phoenix, Ariz. The swatches were examined periodically for discoloration, and the extent of exposure is reported in months and in langleys in the following table:

TABLE XIII

| | Color | | |
|---|---|---|---|
| | Control | Example 15 | Example 16 |
| Before exposure | Colorless | Colorless | Colorless |
| After exposure for: | | | |
| 1 month (15,840 langleys) | do | do | Do. |
| 2 months (32,748 langleys) | Very pale yellow | do | Do. |
| 4 months (64,936 langleys) | do | do | Do. |
| 6 months (96,803 langleys) | Light yellow | Very pale yellow | Very pale yellow. |
| 8 months (131,467 langleys) | do | do | Do. |

It is apparent that the organotin compound and benzophenone (Control) are not as effective as the combination of benzophenone with the heat stabilizer combinations of the invention. The benzophenone has a synergistic effect on the light stabilizing effectiveness of the compositions of the invention.

The Examples 15 and 16 compositions were also found to be heat stable when subjected to heating at 350° F. in an oven. The formulations underwent no significant color change after ninety minutes of exposure.

Example 17

A polyvinyl chloride resin composition was prepared having the following formulation:

Plastic composition: Parts by weight
  Polyvinyl chloride homopolymer _____ 100
  Dibutyltin bis(isooctylthioglycolate) _____ 1.0
  Dibutyltin bis(isooctylmaleate) _____ 1.95
  2 - (2' - hydroxy - 5' - methylphenyl)benzotriazole _____ 0.25
  2,6 - di - tertiary - butyl - p - cresol _____ 0.3

The formulation was blended on a two-roll mill at 340 to 350° F. for five minutes and sheeted off to a thickness of 20 mils. 1 inch by 2 inch swatches were cut from the sheet and exposed to sunlight in accordance with the test procedure of the previous examples. After sixteen months' exposure, no discoloration or embrittlement was noted.

The test compositions were also found to be heat stable when subjected to heating at 350° F. in an oven. The formulation underwent no significant color change after ninety minutes of exposure.

Examples 18 to 21

Polyvinyl chloride resin compositions were prepared having the following formulation:

| Plastic Composition | Parts by Weight | | | |
|---|---|---|---|---|
| | Example 18 | Example 19 | Example 20 | Example 21 |
| Polyvinyl chloride homopolymer | 100 | 100 | 100 | 100 |
| Dibutyltin oxide | 0.47 | 1.4 | 1.4 | 1.4 |
| Dibutyltin maleate | 1.25 | | | |
| Thiomalic acid | 0.18 | 0.55 | 0.55 | 0.55 |
| Isooctyl epoxystearate | 2.0 | | | 3.0 |
| Wax E (oxidized montan wax ester) | 0.25 | | | |
| 2,6-di-tertiary-butyl-p-cresol | 0.35 | 1.05 | 1.3 | 1.3 |
| 2-(2'-hydroxy-5'-methyl-phenyl) benzotriazole | 0.25 | 0.5 | 0.25 | 0.25 |

The stabilizers were blended with the resins on a two-roll mill at 340 to 350° F. for five minutes and sheeted off for a thickness of 20 mils. 1 inch by 2 inch swatches were exposed to sunlight using the test procedure described above. After sixteen months' exposure, no discoloration or embrittlement was noticeable.

The test compositions were also found to be heat stable when subjected to heating at 350° F. in an oven. The formulations underwent no significant color change after ninety minutes of exposure.

Examples 22 to 27

Polyvinyl chloride resin compositions were prepared to the following formulations:

| Plastic Composition, parts by weight | Example Number | | | | | |
|---|---|---|---|---|---|---|
| | 22 | 23 | 24 | 25 | 26 | 27 |
| Polyvinyl chloride homopolymer [1] | 100 | | 85 | | 85 | 85 |
| Polyvinyl chloride homopolymer [2] | | 100 | 15 | | | |
| Vinyl chloride vinyl hexadecyl ether copolymer | | | | 100 | 15 | |
| Chlorinated polyethylene | | | | | | 15 |
| Isooctyl epoxystearate | 2.0 | 2.0 | 2.0 | 2.0 | 2.0 | 2.0 |
| Wax E | 0.25 | 0.25 | 0.25 | 0.25 | 0.25 | 0.25 |
| Dibutyltin bis (isooctyl thioglycolate) | 1.0 | 1.0 | 1.0 | 1.0 | 1.0 | 1.0 |
| Dibutyltin bis (isooctyl maleate) | 1.9 | 1.9 | 1.9 | 1.9 | 1.9 | 1.9 |
| 2,6-di-tertiary-butyl-p-cresol | 0.1 | 0.1 | 0.1 | 1.9 | 1.9 | 1.9 |
| 2-(2'-hydroxy-5'-methyl-phenyl) benzotriazole | 0.1 | 0.1 | 0.1 | 0.1 | 0.1 | 0.1 |

[1] Prepared by the suspension polymerization process.
[2] Prepared by the emulsion polymerization process.

The stabilizers were blended with the resins on a two-roll mill at 340 to 350° F. for five minutes and sheeted off for a thickness of 20 mils. 1 inch by 2 inch swatches were exposed to sunlight using the test procedure described above. After sixteen months' exposure, no discoloration or embrittlement was noticeable.

The test compositions were also found to be heat stable when subjected to heating at 350° F. in an oven. The formulations underwent no significant color change after ninety minutes of exposure.

Examples 28 to 30

Polyvinyl chloride resin compositions were prepared to the following formulation:

| Plastic Composition | Parts by Weight | | |
|---|---|---|---|
| | Example 28 | Example 29 | Example 30 |
| Polyvinyl chloride homopolymer (prepared by the suspension polymerization process) | 100 | 100 | 100 |
| Isooctyl epoxystearate | 2.0 | 2.0 | 2.0 |
| Wax E | 0.25 | 0.25 | 0.25 |
| Di-n-octyltin bis (isooctylthioglycolate) | 1.25 | 1.25 | 1.25 |
| Di-n-octyltin bis (isooctyl maleate) | 2.25 | 2.25 | 2.25 |
| Di-n-dodecyl thiodipropionate | 0.5 | 0.5 | 0.25 |
| 2-(2'-hydroxy-5'-tertiarybutyl-phenyl) benzotriazole | 0.3 | | |
| 2-(2'-hydroxy-5'-tertiarybutyl-phenyl)-5, 6-dichlorobenzotriazole | | 0.3 | |
| 2-(2'-hydroxy-5'-(alphaphenethyl) phenyl) benzotriazole | | | 0.3 |

The stabilizers were blended with the resin on a two-roll mill at 340 to 350° F. for five minutes and sheeted off for a thickness of 20 mils. 1 inch by 2 inch swatches were exposed to sunlight, using the test procedure described above. After sixteen months' exposure, no discoloration or embrittlement was noticeable.

The test compositions were also found to be heat stable when subjected to heating at 350° F. in an oven. The formulations underwent no significant color change after ninety minutes of exposure.

The embodiments of the invention in which an exclusive property or privilege is claimed are defined as follows:

1. A polyvinyl chloride resin stabilizer composition capable of increasing the resistance of polyvinyl chloride resins to deterioration when heated at 350° F. and when exposed to light comprising from about 0.25 to about 10 parts by weight of an organotin compound having from one to three organic radicals linked through carbon to tin by from one to three valences of the tin, the remaining valences of the tin being taken up by groups linked to tin through an atom selected from the group consisting of oxygen and sulfur, from about 0.01 to about 2 parts by weight of a mercapto acid moiety selected from the group consisting of mercaptoacetic acid, alpha-mercaptopropionic acid, and thiomalic acid moieties and from about 0.01 to about 2 parts by weight of a phenolic antioxidant selected from the group consisting of phenols having the structure

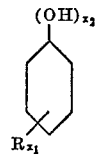

wherein R is selected from the group consisting of hydrogen and the following organic radicals having from one to thirty carbon atoms: hydrocarbon groups, an aromatic ring condensed with the phenol ring, a heterocyclic group, an alkoxy group, a halogen atom and an acyl group

where R' is aryl, alkyl, or hydrogen; $x_1$ and $x_2$ are integers from one to four the sum of $x_1$ and $x_2$ not exceeding 6; and phenols having the structure:

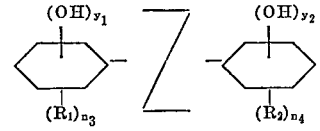

where Z is selected from the group consisting of a single bond, an oxygen atom, a sulfur atom, an alkylene group, an alicyclidene group, an arylene group, an alkylene-alicyclidene group, and an alkylene-arylidene group, $R_1$ and $R_2$ are selected from the group consisting of hydrogen and alkyl groups having from one to about ten carbon atoms, and $y_1$, $y_2$, $n_3$ and $n_4$ are integers, the sum of which in each ring does not exceed five.

2. A composition in accordance with claim 1, wherein the mercapto acid moiety is a mercapto acid radical linked to the tin atom of the organotin compound.

3. A composition in accordance with claim 1, wherein the mercapto acid moiety is an acid.

4. A composition in accordance with claim 3, wherein the mercapto acid is thiomalic acid.

5. A composition in accordance with claim 3, wherein the mercapto acid is alpha-mercapto propionic acid.

6. A composition in accordance with claim 1 wherein the phenol is 2,6-ditertiary butyl-p-cresol.

7. A composition in accordance with claim 1, containing an additional light and heat stabilizer selected from the group consisting of 2-hydroxy benzophenones, 2,4,6-derivatives of 1,3,5-trithianes containing a phenolic hydroxyl group, o-hydroxy-phenylbenzotriazoles, 1-dioxides of $\alpha,\beta$-benzoisothiazolene, alkyl styryl ketones, hydroxyaryl-substituted 1,3,5-triazines in which the hydroxyaryl group is linked to the 1,3,5-triazine ring through carbon, oxygen, sulfur or nitrogen, phosphoramides, $\alpha$-cyano cinnamates and dialkylhydroxybenzoic acids and esters.

8. A composition in accordance with claim 7, in which the additional light stabilizer is a 2-hydroxyphenyl benzotriazole.

9. A polyvinyl chloride resin composition having increased resistance to deterioration when heated at 350° F. and when exposed to light comprising 100 parts polyvinyl chloride resin and the stabilizer composition defined in claim 1.

References Cited

UNITED STATES PATENTS

| | | | |
|---|---|---|---|
| 2,625,521 | 1/1953 | Fischer et al. | 260—45.75 |
| 2,832,751 | 4/1958 | Weinber et al. | 260—45.75 |
| 2,995,540 | 8/1961 | Siegrist et al. | 260—45.8 |
| 2,997,454 | 8/1961 | Leistner et al. | 260—45.8 |
| 3,074,910 | 1/1963 | Dickson | 260—45.75 |
| 3,222,317 | 12/1965 | Kauder | 260—45.75 |

FOREIGN PATENTS

| | | |
|---|---|---|
| 680,535 | 2/1964 | Canada. |

DONALD E. CZAJA, *Primary Examiner.*

V. P. HOKE, *Assistant Examiner.*

UNITED STATES PATENT OFFICE
CERTIFICATE OF CORRECTION

Patent No. 3,398,114                      August 20, 1968

Mark W. Pollock

It is certified that error appears in the above identified patent and that said Letters Patent are hereby corrected as shown below:

Column 3, line 29, after "oxygen" insert -- or air --; line 32, "or" should read -- of --; lines 37 to 41, the formula shoul appear as shown below:

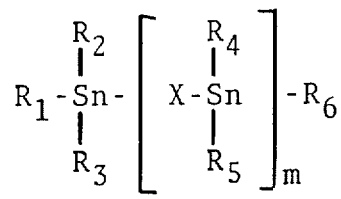

Column 5, lines 14 to 18, formula 2 should appear as shown below:

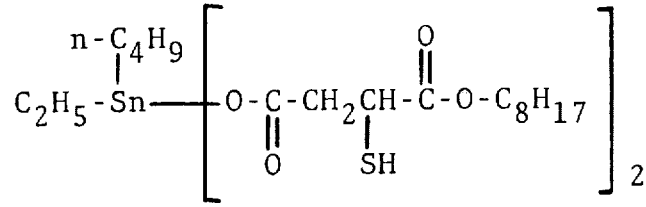

same column 5, lines 19 to 23, formula 3 should appear as shown below:

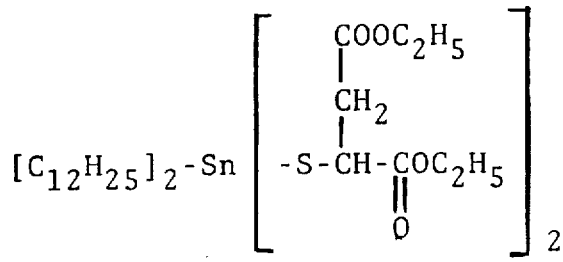

same column 5, lines 24 and 25, formula 4 should appear as shown below:

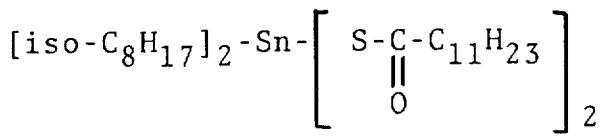

same column 5, lines 26 to 29, formula 5 should appear as shown below:

3,398,114
(2)
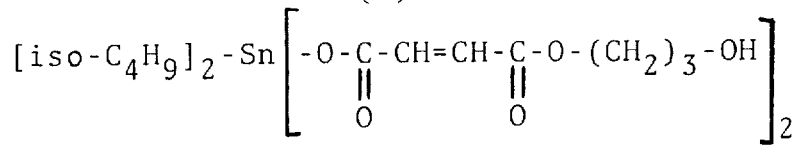
same column 5, lines 35 and 36, formula 7 should appear as shown below:
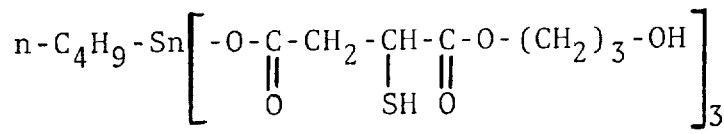
same column 5, lines 37 to 40, formula 8 should appear as shown below:
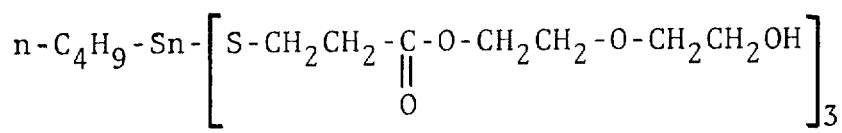
same column 5, lines 41 to 47, formula 9 should appear as shown below:
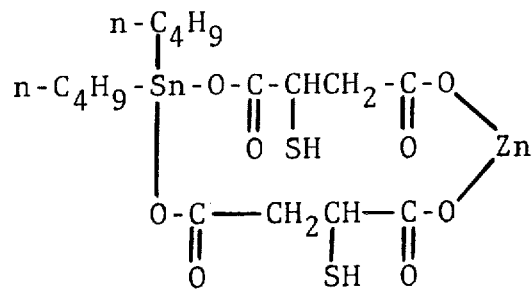
Column 6, lines 14 to 19, formula 17 should appear as shown below:
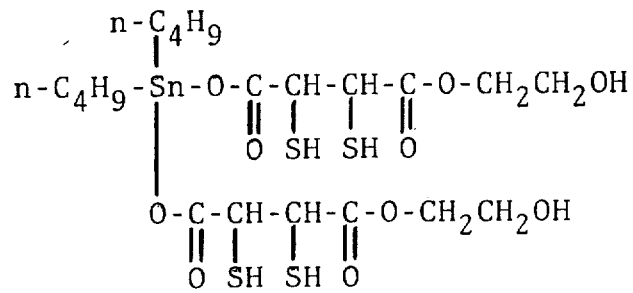
Column 8, about lines 21 and 22, formula 37 should appear as shown below:

(3)

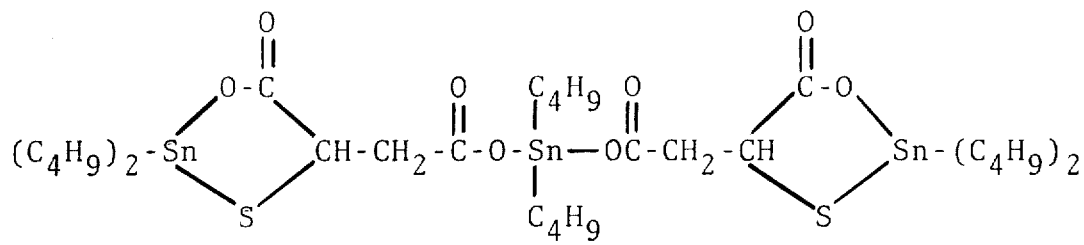

same column 8, about lines 23 to 32, formula 38 should appear as shown below:

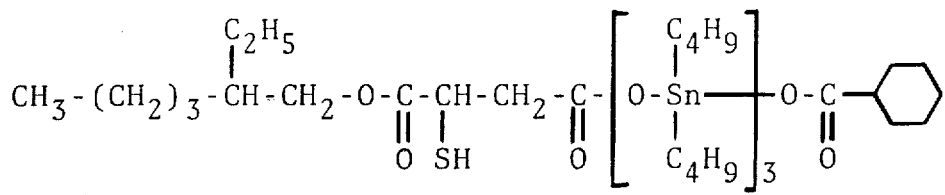

Column 9, line 8, formula 51 should appear as shown below:

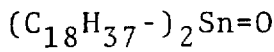

same column 9, line 46, "Rerseach" should read -- Research --. Column 10, line 11, "orcino" should read -- orcinol --; line 66, "4,4′-n-butylidenebis(-(2-tertiary butyl-5-methylphenol)," should read -- 4,4′-n-butylidenebis-(2-tertiary butyl-5-methylphenol), --. Column 11, line 15, "in" should read -- is --; line 33, formula (c) should appear as shown below:

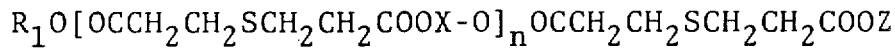

same column 11, line 44, "2-ethyl hexyl" and "t-octyl" should read -- 2-ethyl hexyl, -- and -- t-octyl, --; line 46, "xylyl" should read -- xylyl, --. Column 12, line 29, "nonly" should read -- nonyl --; line 61, "nitorgen" should read -- nitrogen --. Column 13, line 38, "isootcyl" should read -- isooctyl --; line 39, "tri(t-nonlyphenyl)" should read -- tri(t-nonylphenyl) --. Column 14, line 13, "$R_{20}$" should read -- $R_{10}$ --; line 32, "includes" should read -- include --. Column 16, line 16, "polyvnyl" should read -- polyvinyl --. Column 18, line 46, "methoxy" should read -- methoxy, --. Column 20, lines 26 and 27, "octadecylhydroxyphenl" should read -- octadecylhydroxyphenyl --; lines 65 and 66, "2-hydroxy benzaldehyde bis(n- dodecylmercaptal" should read -- 2-hydroxy benzaldehyde bis(n-dodecylmercaptal) --. Columns 21 and 22, TABLE I, column B, under the heading "Color", opposite "After 105 minutes", "do" should read -- Yellow brown --.

Signed and sealed this 7th day of April 1970.

(SEAL)
Attest:

EDWARD M. FLETCHER, JR.
Attesting Officer

WILLIAM E. SCHUYLER, JR.
Commissioner of Patents